United States Patent
Tsai et al.

(10) Patent No.: US 10,795,074 B2
(45) Date of Patent: Oct. 6, 2020

(54) BACKLIGHT ASSEMBLY AND DISPLAY DEVICE APPLYING THE SAME

(71) Applicant: Innolux Corporation, Miao-Li County (TW)

(72) Inventors: Ping-Hsun Tsai, Miao-Li County (TW); Shih-Fu Liao, Miao-Li County (TW); I-An Yao, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 16/582,064

(22) Filed: Sep. 25, 2019

(65) Prior Publication Data

US 2020/0132917 A1 Apr. 30, 2020

(30) Foreign Application Priority Data

Oct. 24, 2018 (CN) .......................... 2018 1 1242707

(51) Int. Cl.
*F21V 8/00* (2006.01)

(52) U.S. Cl.
CPC ......... *G02B 6/0068* (2013.01); *G02B 6/0018* (2013.01); *G02B 6/0088* (2013.01)

(58) Field of Classification Search
CPC .. G02B 6/0068; G02B 6/0088; G02B 6/0018; G02B 6/71; G02B 6/0061; G02B 6/0053
USPC ....................................................... 362/97.1
See application file for complete search history.

(56) References Cited

U.S. PATENT DOCUMENTS

| 8,289,475 B2 | 10/2012 | Arai et al. |
| 2005/0057913 A1 | 3/2005 | Dennis |
| 2011/0234742 A1* | 9/2011 | Nagumo ............ G06K 15/1238 347/224 |
| 2017/0123274 A1* | 5/2017 | Jeong ................ G02F 1/133603 |

FOREIGN PATENT DOCUMENTS

TW 201027193 A 7/2010

* cited by examiner

*Primary Examiner* — Ali Alavi
(74) *Attorney, Agent, or Firm* — McClure, Qualey & Rodack, LLP

(57) ABSTRACT

A backlight assembly includes an optical plate, a light source provided near the optical plate, and a brightness redistribution film provided above the optical plate. When light emitted from the light source passes through the optical plate and the brightness redistribution film, a front view angle brightness measured in a normal direction of a light exiting surface of the brightness redistribution film relative to a maximum brightness emitted from the backlight assembly has a brightness ratio N, wherein the brightness ratio N is greater than or equal to 60% and is smaller than 100% (60%≤N<100%).

20 Claims, 11 Drawing Sheets

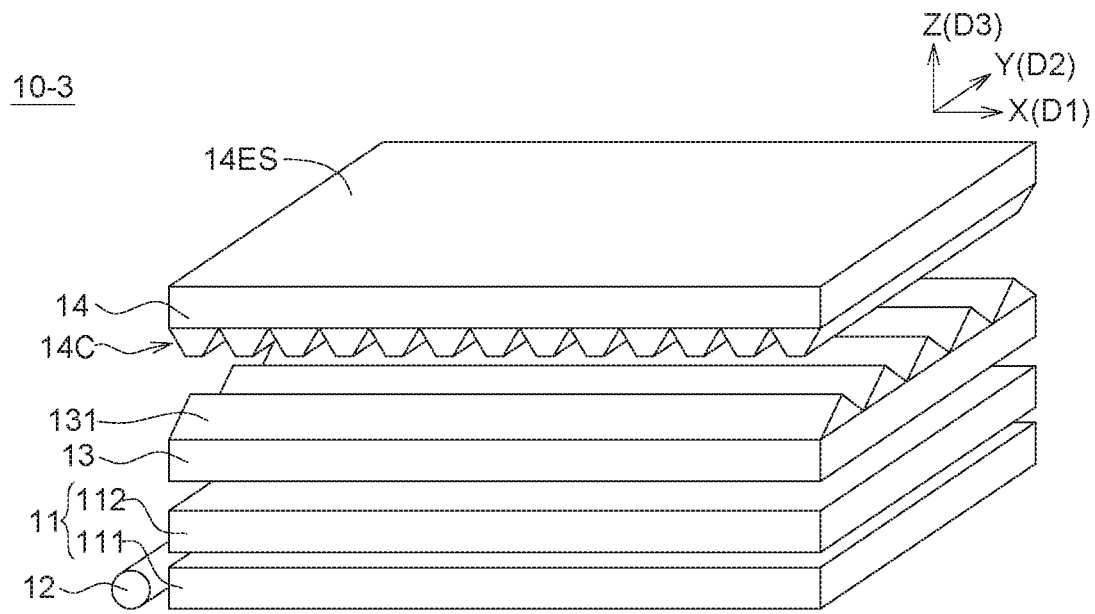
FIG. 5A
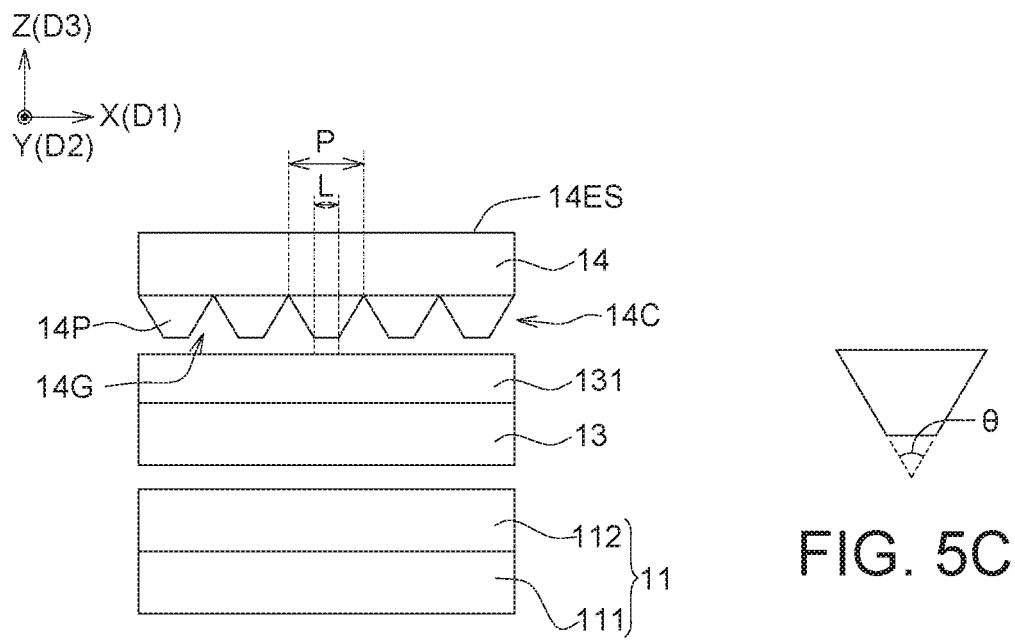
FIG. 5B
FIG. 5C

BACKLIGHT ASSEMBLY AND DISPLAY DEVICE APPLYING THE SAME

This application claims the benefit of People's Republic of China application Serial No. 201811242707.8, filed on Oct. 24, 2018, the subject matter of which is incorporated herein by reference.

BACKGROUND OF THE INVENTION

Field of the Invention

The disclosure relates to a backlight assembly and a display device applying the same, and more particularly to a backlight assembly capable of adjusting a horizontal view angle brightness and a display device applying the same.

Description of the Related Art

Electronic products having display devices are indispensable essentials for modern people in aspects of work, learning, and lifestyle recreation and entertainment. Various associated products from personal computers, communications and consumer electronics such as smartphones, tablet computers and laptop computers, to everyday life products such as televisions, electronic boards or even in-vehicle displays, are pervasive in all parts of the daily life. Consumers also have different pursuits and expectations in regard to electronic characteristics of different electronic products along with objects of the products.

Taking an in-vehicle display for instance, primary users of an in-vehicle display are a driver and a front passenger. A backlight module of a current in-vehicle display commonly uses a single prism plate for correcting the direction of light, so as to condense light and to enhance overall luminosity and evenness to achieve an effect of increasing brightness. However, the maximum brightness generated by the above structure is still at a front view angle (that is, a horizontal view angle of 0 degree). For a driver and a front passenger seated on two sides of the in-vehicle display, a darker image is perceived due to the issue of a view angle when viewing the in-vehicle display, in a way that an optimal effect of application cannot be achieved.

SUMMARY OF THE INVENTION

The disclosure is directed to a backlight assembly and a display device applying the backlight assembly, in which a brightness redistribution film is used to achieve effects of adjusting a horizontal view angle brightness and moving a view angle having a maximum brightness from a front view angle towards two sides along a horizontal direction, thereby increasing the brightness of other horizontal view angles apart from the front view angle, while maintaining a display brightness of a certain range for the front view angle.

A backlight assembly is provided according to the disclosure. The backlight assembly includes an optical plate, a light source provided near the optical plate, and a brightness redistribution film provided above the optical plate. When light emitted by the light source passes through the optical plate and the brightness redistribution film, a front view angle brightness measured in a normal direction of a light exiting surface of the brightness redistribution film relative to a maximum brightness emitted from the backlight module has a brightness ratio N, wherein the brightness ratio N is greater than or equal to 60% and is smaller than 100% (60%≤N<100%).

A display device is provided according to the disclosure. The display device includes a display panel, and the above backlight assembly provided on one side of the display panel and for providing the display panel with light.

The above and other aspects of the disclosure will become better understood with regard to the following detailed description of the preferred but non-limiting embodiments. The following description is made with reference to the accompanying drawings.

BRIEF DESCRIPTION OF THE DRAWINGS

FIG. 5A is a schematic diagram of a backlight assembly according to a third embodiment of the disclosure, and FIG. 5B is a section schematic diagram of some elements in FIG. 5A;

FIG. 5C is a section schematic diagram of one single protrusion in FIG. 5B;

DETAILED DESCRIPTION OF THE INVENTION

Figure 1A:
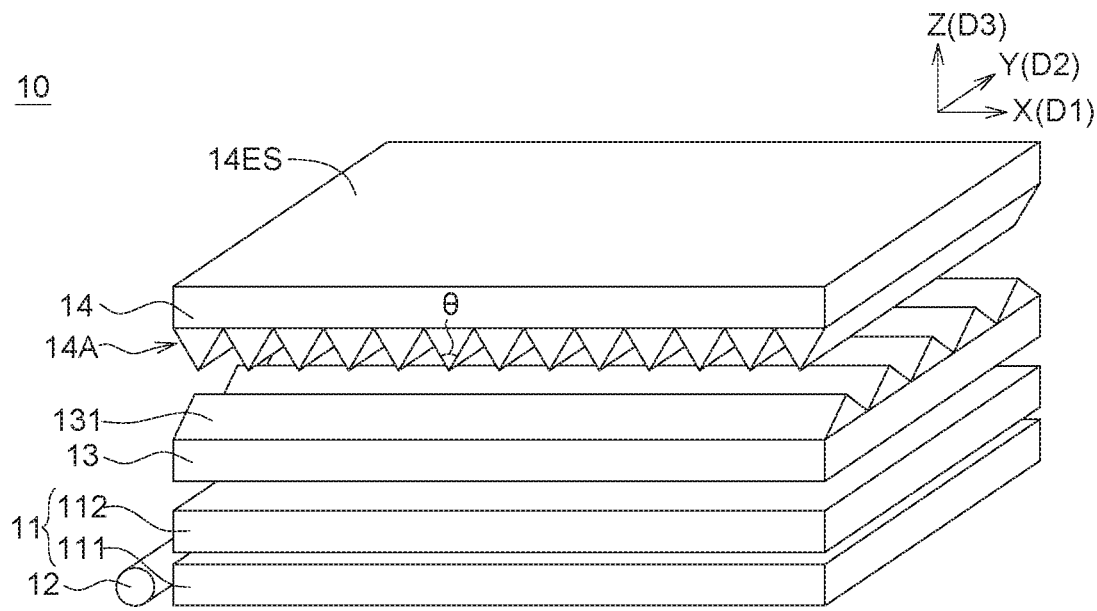
FIG. 1A is a schematic diagram of a backlight assembly according to a first embodiment of the disclosure.

Embodiments of the disclosure provide a backlight assembly and a display device applying the backlight assembly, in which the brightness of different horizontal view angles can be adjusted and distributed by using a brightness distribution film when light emitted by a light source passes through the brightness redistribution film, such that the horizontal view angles on which the maximum brightness occurs are moved from the front view angle towards two sides along a horizontal direction to enhance the brightness of horizontal view angles apart from the front view angle, while a display brightness of a certain range for the front view angle is also maintained.

In the disclosure, a horizontal view angle refers to an included angle between a line of sight and a normal when a normal direction of a light exiting surface of the brightness redistribution film is a reference. For illustration purposes, in the disclosure, a view angle on the right of a normal is defined as being greater than 0 degree, and a view angle on the left of the normal is defined as being smaller than 0 degree. When a view angle is equal to 0 degree, it means that the line of sight is parallel to the normal direction of the light exiting surface of the brightness redistribution film, and is referred to as a front view angle at this point.

In a backlight assembly according to an embodiment, when light emitted by a light source passes through an optical plate and the brightness redistribution film, a front view angle brightness measured in the normal direction of the light exiting surface of the brightness redistribution film is divided by a maximum brightness emitted from the backlight assembly to obtain a brightness ratio N, where N is greater than or equal to 60% and smaller than 100% (60%≤N<100%). In a backlight assembly according to another embodiment, N is greater than or equal to 80% and is smaller than 100% (80%≤N<100%). Further, a display device applied includes a display panel, and a backlight assembly according to an embodiment for providing the display panel with light.

Various implementation forms of the disclosure are described in detail with the accompanying drawings below. It should be noted that, structures, processes and contents of the implementation forms provided by the embodiments are examples for illustrations, and the scope of the disclosure claiming protection is not limited to these implementation forms described. It should be noted that, the disclosure does not describe all possible embodiments, and a person skilled in the art could make variations and modifications to the structures and processes described in the embodiments without departing from the spirit and the scope of the disclosure so as to satisfy requirements of actual applications. Therefore, other implementation forms provided by the disclosure may be also applied. Further, identical or similar denotations in the embodiments are used to indicate identical or similar parts. In addition, the drawings are simplified to clearly explain contents of the embodiments, and sizes and ratios in drawings are not drawn according to actual scales of actual products and are not to be construed as limitations to the scope of the disclosure.

Further, terms such as ordinal numbers "first", "second" and "third" used in the description and claims are for modifying elements in the claims; these terms do mean that the claimed elements have any ordinal numbers therebefore, nor do they mean sequences of a particular claimed element and another claimed elements or sequences of a manufacturing method. The use of the ordinal numbers is merely for clearly distinguishing a claimed element having a particular naming from a claimed element having the same naming. Moreover, when it is described that a first material is located on, above or over a second material layer, unless otherwise specified, a situation where the first material layer and the second material layer are in direct contact can be included. Alternatively, a situation where one or more other material layers are spaced therebetween can be included. In this case, the first material layer and the second material layer may not be in direct contact.

In the disclosure, terms "about", "approximately", "roughly" and "substantially" usually mean within 20%, 10%, 5%, 3%, 2%, 1% or 0.5% of a specified value or a range. The specified number is an approximately number; that is, when "about", "approximately", "roughly" and "substantially" are not specified, meanings of "about", "approximately", "roughly" and "substantially" can be implied.

First Embodiment

Figure 1B:
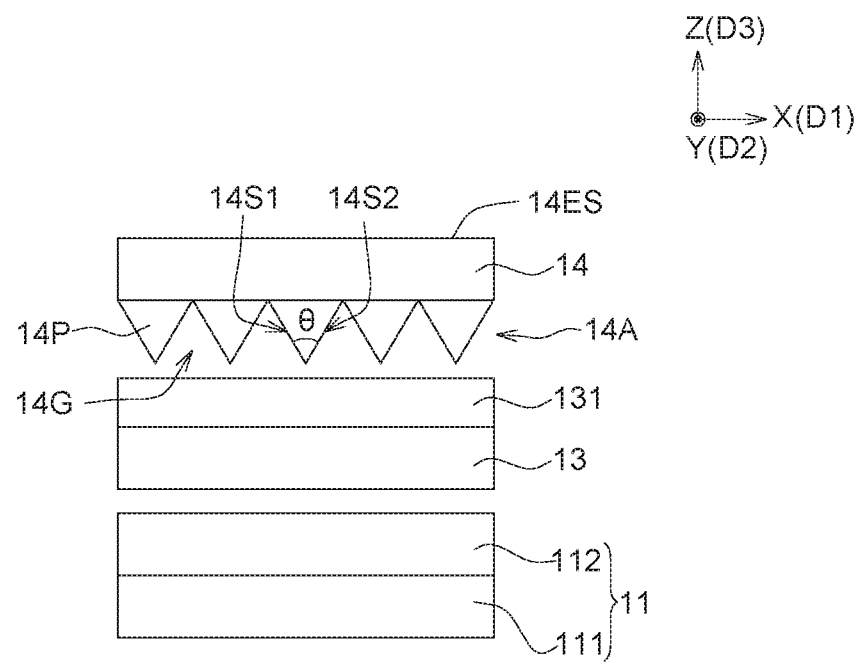
FIG. 1B is a section schematic diagram of some elements in FIG. 1A.

FIG. 1A shows a schematic diagram of a backlight assembly according to a first embodiment of the disclosure, and FIG. 1B shows a section schematic diagram of some elements in FIG. 1A. In the first embodiment, a backlight assembly 10 includes an optical plate 11, a light source 12 provided near the optical plate 11, and a brightness redistribution film 14 provided above the optical plate 11. When light emitted by the light source 12 passes through the optical plate 11 and the brightness redistribution film 14, a front view angle brightness measured in a normal direction (e.g., the Z direction) of a light exiting surface 14ES of the brightness redistribution film 14 relative to a maximum brightness emitted from the backlight module 10 has a brightness ratio N, where N is smaller than 100% and greater than or equal to 60% (60%≤N<100%). In a backlight assembly according to another embodiment, the brightness ratio N is smaller than 100% and greater than or equal to 80% (80%≤N<100%).

In this embodiment, the brightness redistribution film 14 has a structured surface 14A provided towards the optical plate 11, and the other side opposite to the structured surface 14A is the light exiting surface 14ES of the brightness redistribution film 14. The structured surface 14A includes a plurality of protrusions 14P and a plurality of grooves 14G. As shown in FIGS. 1A and 1B, the protrusions 14P and the grooves 14G are alternately configured; for example, the protrusions 14P and the grooves 14G are alternately arranged along a first direction D1 (e.g., the X direction). In this embodiment, a cross section shape of the protrusions 14P is, for example, a triangle, and has an angle θ. As shown, the angle θ of the protrusions 14P can be defined as an included angle of two sides 14S1 and 14S2 of one protrusion 14P.

The backlight assembly according to the embodiment can further include an optical film 13 located between the optical plate 11 and the brightness redistribution film 14. The optical film 13 is, for example but not limited to, a brightness enhancement film (BEF), multiple diffusion films, or a combination of the above, depending on actual application requirements. The brightness enhancement film can enhance the maximum output brightness of the backlight assembly by means of light collection, and diffusion films can evenly distribute light. In this embodiment, the optical film 13 includes a plurality of prisms 131. In some embodiment of the disclosure, the axial direction of the prisms 131 is substantially the same as an extension direction of the protrusions 14P of the brightness redistribution film 14. In other embodiments of the disclosure, the axial directions of the prisms 14 are provided at an included angle from the extension direction of the protrusions 14P of the brightness redistribution film 14. In other some embodiments of the disclosure, the included angle is an acute angle; in other embodiments, the included angle is 90 degrees. For example, in the embodiment shown in FIGS. 1A and 1B, the axial direction of the prisms 131 on the optical film 13 extend along the first direction D1, the protrusions 14P on the brightness redistribution film 14 extend along a second direction D2, and an included angle between the first direction D1 and the second direction D2 is 90 degrees; however, the disclosure is not limited thereto. In an actual application, the optical film 13 having prisms is for condensing an exit direction of light towards a normal direction (e.g., the Z direction) of the light exiting surface 14ES of the brightness redistribution film 14; the brightness redistribution film 14 having the structured surface 14A is further used for adjusting the exit direction of light. Therefore, horizontal view angles having a maximum brightness can move towards two sides along the horizontal direction, while brightness of a front view angle is maintained in a certain range. An example of brightness is redistribution is explained by using to a part of simulation experimentation and experimental results performed according to implementation of the first embodiment below.

Figure 2:
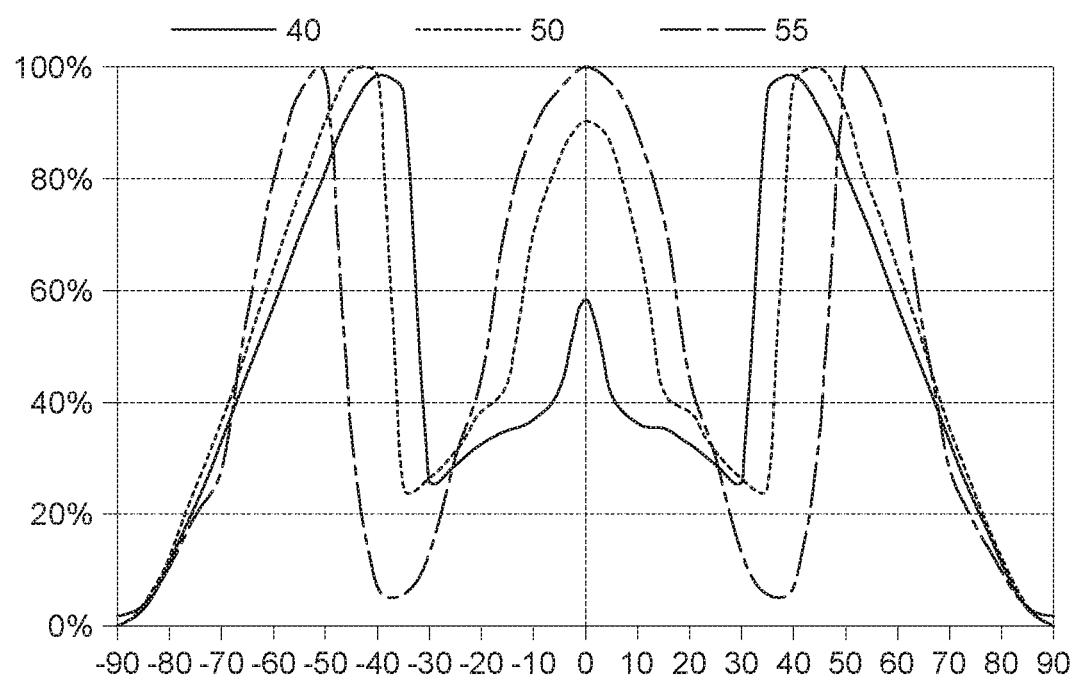
FIG. 2 shows brightness distribution curves on horizontal view angles under a condition of different protrusion angles according to the first embodiment of the disclosure.

FIG. 2 shows brightness distribution curves on horizontal view angles under conditions of different protrusion angles θ of a backlight assembly according to the first embodiment of the disclosure. The curves are brightness distribution curves of horizontal view angles from −90 degrees to 90 degrees obtained when the protrusion angles θ are equal to 40 degrees, 50 degrees and 55 degrees. As shown in FIG. 2, when the angle θ (the included angle between the two sides 14S1 and 14S2 of the protrusion 14) of the protrusion 14P is 40 degrees, the brightness ratio N of a front view angle brightness to the maximum brightness is still slightly less than 60%. However, when the protrusion angle θ continues increasing to more than 50 degrees, the brightness ratio N of a front view angle brightness to the maximum brightness can reach between 60% and 100% (60%≤N<100%), or even between 80% and 100% (80%≤N<100%). At this point, the maximum brightness emitted from the backlight assembly appears in ranges between 20 degrees and 60 degrees (20 degrees≤horizontal view angle≤60 degrees) and between −60 degrees and −20 degrees (−20 degree≤horizontal view angle≤−60 degrees).

When the protrusion angle θ reaches 55 degrees, the brightness ratio N of the front view angle brightness to the maximum brightness can reach approximately 100%.

Therefore, the backlight assembly according to the first embodiment achieves a good effect on enhancing the brightness of horizontal view angles apart from the front view angle by adjusting the protrusion angle θ on the brightness redistribution film 14; that maximum brightness may appear on two sides of the horizontal view angles (e.g., between 20 degrees and 60 degrees, and between −20 degrees and −60 degrees), while the brightness of the front view angle is also enhanced. For example, when the protrusion angle θ is between 40 degrees and 45 degrees (40 degrees<θ<45 degrees), the brightness ratio N of the front view angle brightness to the maximum brightness can reach between 60% and 100% (60%≤N<100%), or even between 80% and 100% (80%≤N<100%).

Further, it should be noted that, in the drawings of the embodiment, the protrusions 14P having the same shape and size are depicted (e.g., for example, the angles θ of the protrusions are substantially equal); however, the disclosure is not limited thereto. Moreover, the protrusions are not limited to being periodical structures. For example, a combination of multiple protrusions having different angles within a particular angle range (e.g., 45 degrees to 54 degrees) can also achieve the effect of adjusting the peak view angle peak. In addition, according to the embodiment of the disclosure, the brightness distribution curve on the horizontal view angles does not necessarily present a symmetrical distribution relative to the front view angle (when the horizontal view angle is 0 degree); that is, the maximum brightness generated on the two sides of the front view angle does necessarily correspond to symmetrical horizontal view angles. For example, the maximum brightness on the left of the normal of the light exiting surface 14ES may correspond to a horizontal view angle of −40 degrees, whereas the maximum brightness on the left of the normal of the light exiting surface 14ES may correspond to a horizontal view angle of +45 degrees, which can be achieved by adjusting the structural form of the protrusions 14P (e.g., adjusting the angle θ of the protrusions), so as to satisfy actual application requirements.

In this embodiment, a side-illuminating light source is used for explaining the embodiment, and the optical plate 11 at this point includes, for example, a light guide plate 111 and a diffusion plate 112 located on the light guide plate 111. However, the disclosure does not limit the technology of the light source applied. The embodiment of the disclosure may adopt a side-illuminating light source or a direct light source, so as to provide a display device with the light required. In an embodiment adopting a direct light source, an optical plate of the backlight assembly includes a diffusion plate (with the light guide plate omitted), and the light source is provided below the diffusion plate.

Second Embodiment

Figure 3A:
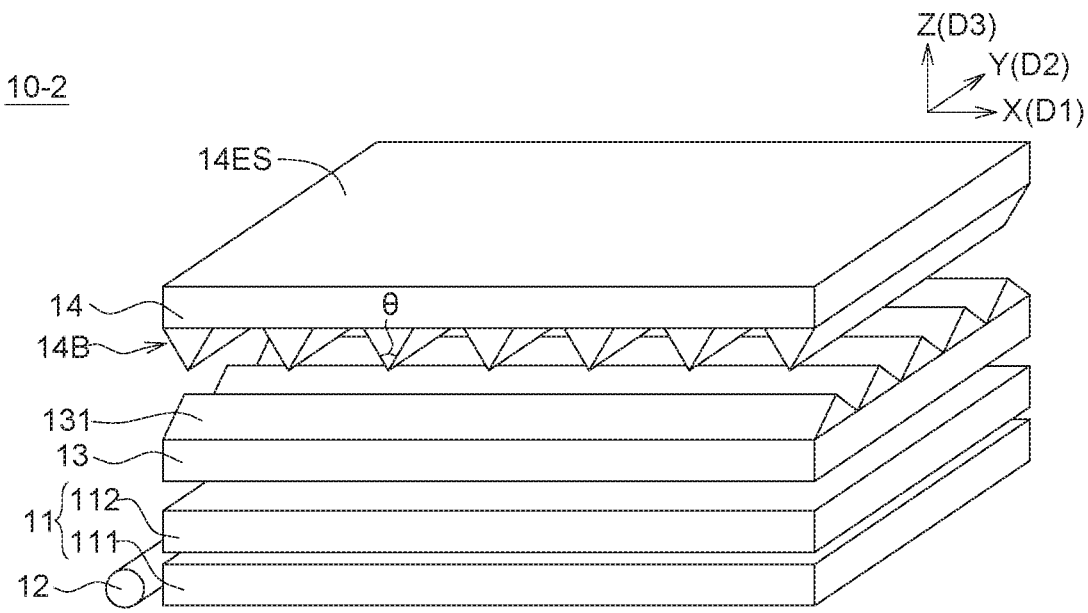
FIG. 3A is a schematic diagram of a backlight module according to a second embodiment of the disclosure.
Figure 3B:
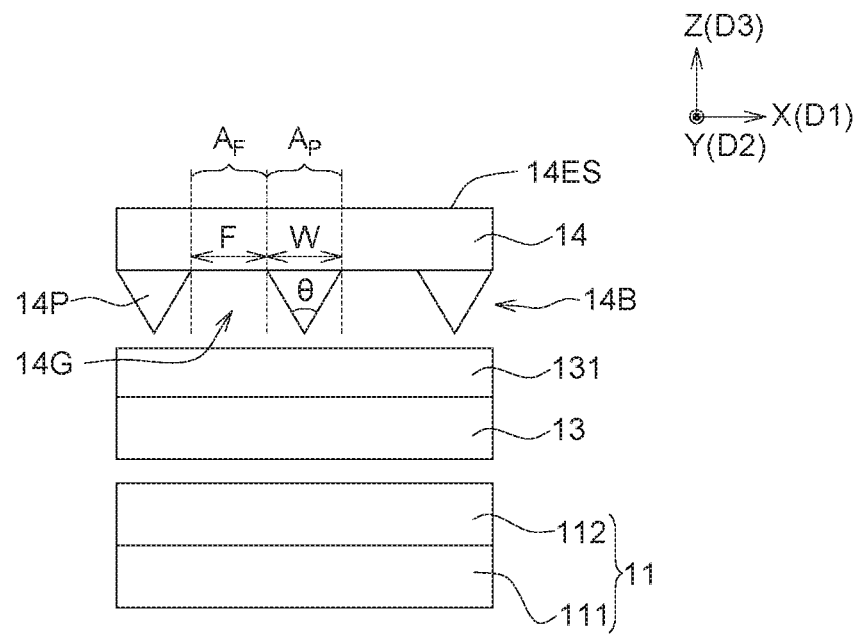
FIG. 3B is a section schematic diagram of some elements in FIG. 3A.

FIG. 3A shows a schematic diagram of a backlight assembly according to a second embodiment of the disclosure, and FIG. 3B shows a section schematic diagram of some elements in FIG. 3A. In the second embodiment, a backlight assembly 10-2 includes an optical plate 11, a light source 12 provided near the optical plate 11, and a brightness redistribution film 14 provided above the optical plate 11. The brightness redistribution film 14 has a structured surface 14B provided towards the optical plate 11, and the structured surface 14B includes a plurality of protrusions 14P and a plurality of grooves 14G. The other side of the brightness redistribution film 14 is a light exiting surface 14ES opposite to the structured surface 14B. When light emitted from the light source 12 passes through the optical plate 11 and the brightness redistribution film 14, a front view angle brightness measured in a normal direction (a front view angle) of the light exiting surface 14ES of the brightness redistribution film 14 relative to a maximum brightness emitted from the backlight assembly 10 has a brightness ratio N, where N can reach between 60% and 100% (60%≤N<100%), or even between 80% and 100% (80%≤N<100%).

The structure of the backlight assembly in FIGS. 3A and 3B differs from that in FIGS. 1A and 1B in that, the groove 14G of the brightness redistribution film 14 has a flat region $A_F$, and a region where the protrusion 14P of the brightness redistribution film 14 is located is regarded as a microstructure region $A_P$. The elements in FIGS. 3A and 3B same as those in FIGS. 1A and 1B use the same denotations. Thus, details of the associated layers and components in FIGS. 3A and 3B, including the elements/layers and the space arrangements thereof, can be referred from the description associated with FIGS. 1A and 1B and are omitted herein.

As shown in FIG. 3B, the protrusion 14P has a maximum width W in a first direction D1 (e.g., the X direction), and the flat region $A_F$ has a flat width F in the first direction D1. In one embodiment, the ratio of the flat width F relative to the maximum width W (F/W) of the protrusion 14P is, for example, between 0 and 5. When F/W=0, i.e., an implementation form where the first embodiment has no flat region, the bottom parts of the protrusions 14P are connected to one another, as shown in FIGS. 1A and 1B. When 0<F/W≤5, the implementation form is as shown in FIGS. 3A and 3B.

In one embodiment, with matching design conditions, effects that horizontal view angles having a maximum brightness move from the front view angle towards two sides along the horizontal direction, while the front view angle has a sufficient brightness, can be achieved. For example, in one embodiment, when 0<F/W≤5 and the angle θ of the protrusion 14P is between 45 degrees and 95 degrees, the backlight assembly provides a maximum brightness at horizontal view angles of 10 degrees to 60 degrees and −60 degrees to −10 degrees.

An example of brightness redistribution is explained by using to a part of simulation experimentation and experimental results performed according to implementation of the second embodiment below.

Figure 4A:
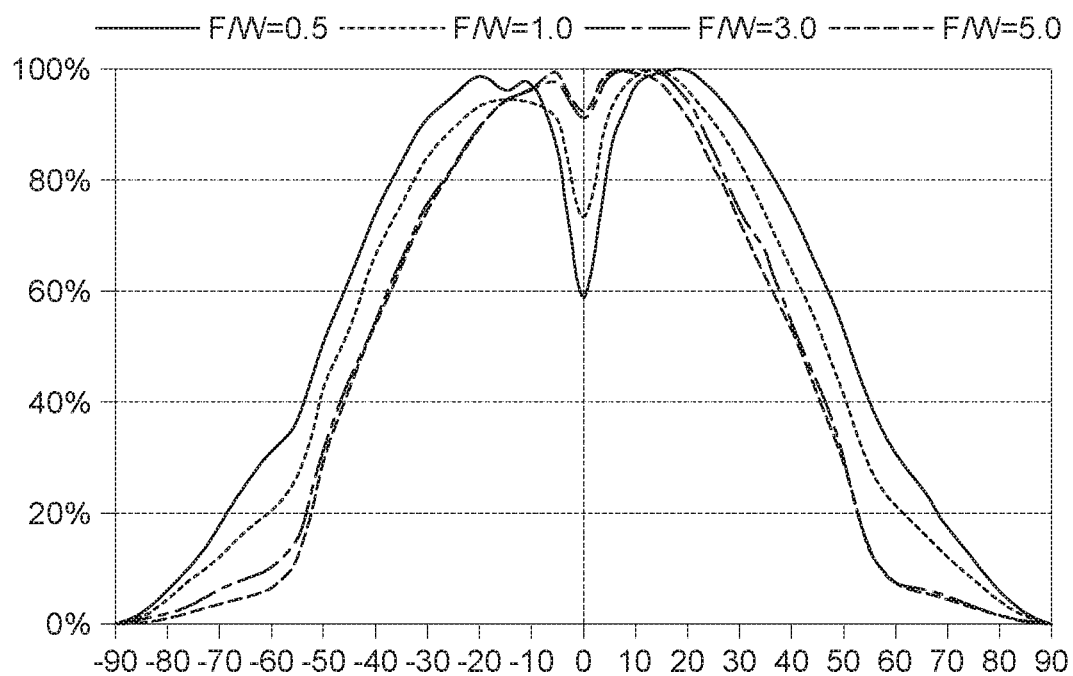
FIG. 4A shows brightness distribution curves on horizontal view angles under conditions of different ratios of flat width to maximum protrusion width (F/W) and a 95-degree protrusion angle of the backlight assembly according to the second embodiment of the disclosure.

FIG. 4A shows brightness distribution curves on horizontal view angles of the backlight assembly under conditions of different F/W ratios and a 95-degree protrusion angle θ according to the second embodiment of the disclosure. The curves are brightness distribution curves of horizontal view angles of −90 degrees to 90 degrees obtained when ratios of the flat width F relative to the maximum protrusion width W (F/W) are equal to 0.5, 1.0, 8.0 and 5.0, respectively. When the ratio F/W of the flat width F relative to the maximum protrusion width W is equal to 0.5, a brightness ratio N of a front view angle brightness to a maximum brightness is approximately equal to 60%. As the ratio F/W gradually increases, the brightness ratio N gradually increases and reaches between 60% and 100% (60%≤N<100%), or even between 80% and 100% (80%≤N<100%). Under the conditions (where θ is 95 degrees, and 0.5≤F/W≤5.0) of this embodiment, the backlight assembly provides a maximum brightness on horizontal view angles of approximately 10 degrees to 25 degrees and −25 degrees to −10 degrees.

Figure 4B:
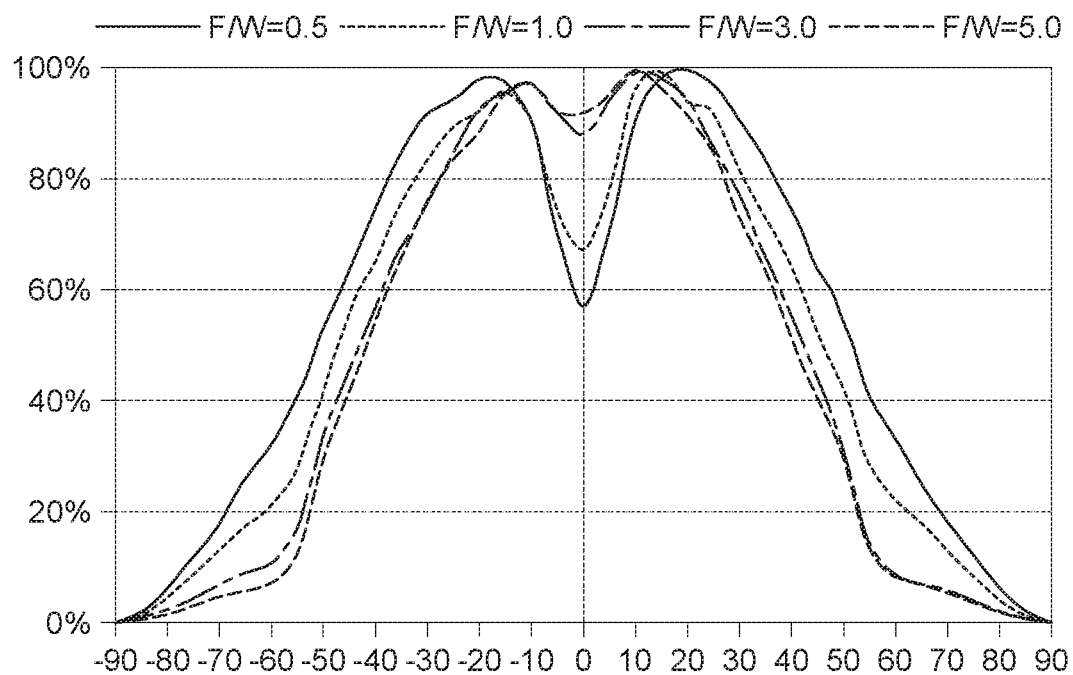
FIG. 4B shows brightness distribution curves on horizontal view angles under conditions of different ratios of flat width to maximum protrusion width (F/W) and a 90-degree protrusion angle of the backlight assembly according to the second embodiment of the disclosure.

FIG. 4B shows brightness distribution curves on horizontal view angles of the backlight assembly under conditions of different F/W ratios and a 90-degree protrusion angle θ according to the second embodiment of the disclosure. The curves are brightness distribution curves of horizontal view angles of −90 degrees to 90 degrees obtained when ratios of the flat width F relative to the maximum protrusion width W (F/W) are equal to 0.5, 1.0, 3.0 and 5.0, respectively. When the ratio F/W of the flat width F relative to the maximum protrusion width W is equal to 0.5, the brightness ratio N of the front view angle brightness to the maximum brightness is slightly smaller than 60%. As the ratio F/W gradually increases, the brightness ratio N gradually increases such that N reaches between 60% and 100% (60%≤N<100%), or even between 80% and 100% (80%≤N<100%). Under the conditions (where θ is 90 degrees, and 0.5≤F/W≤5.0) of this embodiment, the backlight assembly provides a maximum brightness on horizontal view angles of approximately 10 degrees to 25 degrees and −25 degrees to −10 degrees.

Figure 4C:
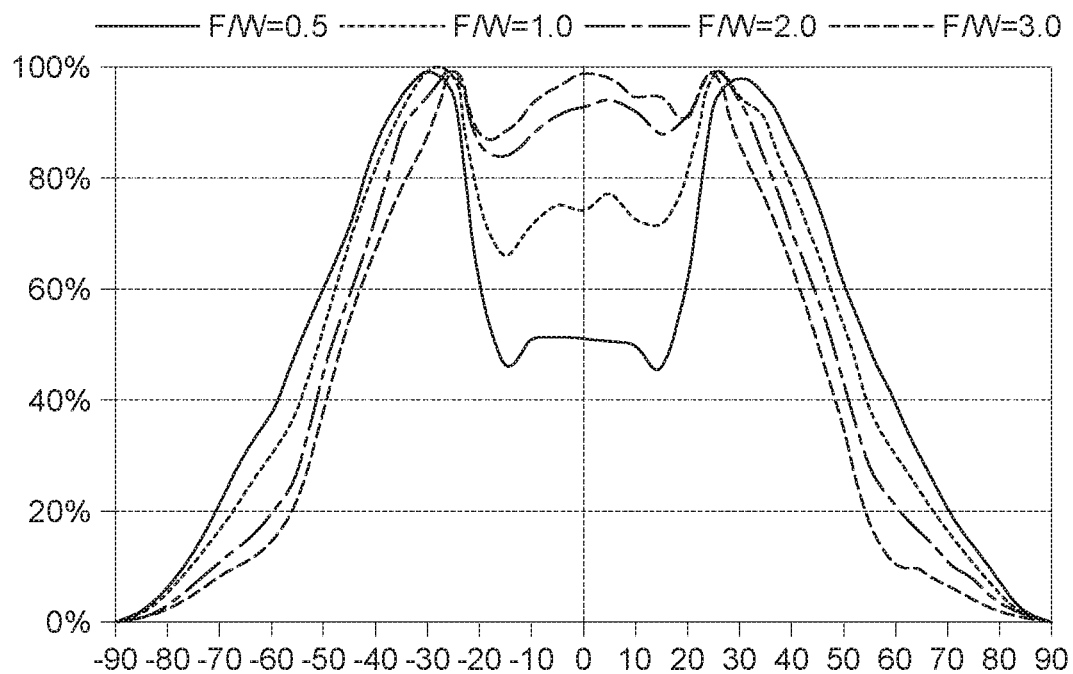
FIG. 4C shows brightness distribution curves on horizontal view angles under conditions of different ratios of flat width to maximum protrusion width (F/W) and a 70-degree protrusion angle of the backlight assembly according to the second embodiment of the disclosure.

FIG. 4C shows brightness distribution curves on horizontal view angles of the backlight assembly under conditions of different F/W ratios and a 70-degree protrusion angle θ according to the second embodiment of the disclosure. The curves are brightness distribution curves of horizontal view angles of −90 degrees to 90 degrees obtained when ratios of the flat width F relative to the maximum protrusion width W (F/W) are equal to 0.5, 1.0, 2.0 and 3.0, respectively. When the ratio R/W of the flat width F relative to the maximum protrusion width W is equal to 0.5, the brightness ratio N of the front view angle brightness to the maximum brightness is slightly smaller than 60%. As the ratio F/W gradually increases, the brightness ratio N gradually increases. For example, when F/W=1.0, the brightness ratio N is greater than 60%; when F/W=3.0, the brightness ratio N is close to 100%. Under the conditions (where θ is 70 degrees, and 0.5≤F/W≤3.0) of this embodiment, the backlight assembly provides a maximum brightness on horizontal view angles of approximately 10 degrees to 35 degrees and −35 degrees to −10 degrees.

Figure 4D:
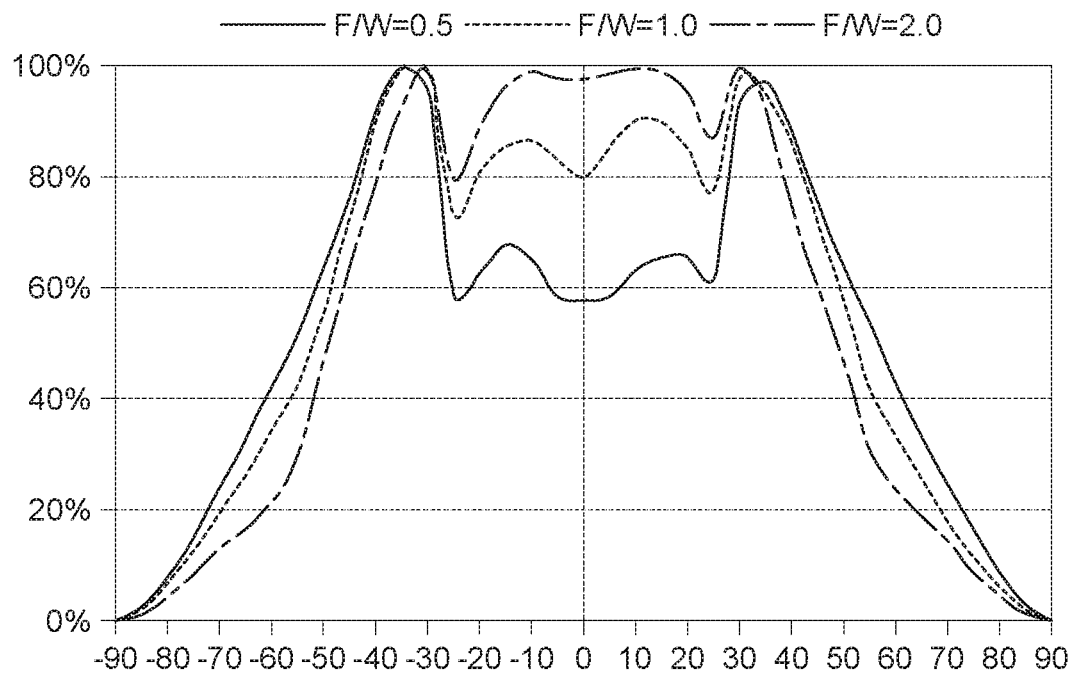
FIG. 4D shows brightness distribution curves on horizontal view angles under conditions of different ratios of flat width to maximum protrusion width (F/W) and a 60-degree protrusion angle of the backlight assembly according to the second embodiment of the disclosure.

FIG. 4D shows brightness distribution curves on horizontal view angles of the backlight assembly under conditions of different F/W ratios and a 60-degree protrusion angle θ according to the second embodiment of the disclosure. The curves are brightness distribution curves of horizontal view angles of −90 degrees to 90 degrees obtained when ratios of the flat width F relative to the maximum protrusion width W (F/W) are equal to 0.5, 1.0 and 2.0, respectively. When the ratio F/W of the flat width F relative to the maximum protrusion width W is equal to 0.5, the brightness ratio N of the front view angle brightness to the maximum brightness is slightly smaller than 60%. As the ratio F/W gradually increases, the brightness ratio N gradually increases and. For example, when F/W=1.0, the brightness ratio N is greater than 80%; when F/W=2.0, the brightness ratio N is close to 100% Thus, it is known that, when the protrusion angle θ reduces, a range of the ratio F/W that renders the brightness ratio N to reach between 60% and 100% (60%≤N<100%), or even between 80% and 100% (60%≤N<100%), also gradually narrows. Under the conditions (where θ is 60 degrees, and 0.5≤F/W≤2.0) of this embodiment, the backlight assembly provides a maximum brightness on horizontal view angles of approximately 10 degrees to 35 degrees and −35 degrees to −10 degrees.

According to experimental results, the design of adding the flat region $A_F$ to the brightness redistribution film 14 can enhance the front view brightness by changing the ratio of the flat width F of the flat region $A_F$ to the maximum protrusion width W. As the protrusion angle θ reduces, the adjustable range that renders the brightness ratio N to reach an appropriate range (e.g., 60%≤N<100%) also narrows. For example, when θ is equal to 95 degrees, a ratio F/W ranging between 0.5 and 5 (0.5<F/W≤5.0) provides a more significant effect of enhancing the front view angle brightness; when θ is equal to 60 degrees, a ratio F/W ranging between 0.5 and 2 (0.5<F/W≤2.0) provides a more significant effect of enhancing the front view angle brightness. It should be noted that, the simulation experimental results such as those in FIGS. 4A to 4D are for illustration purposes, and a combination of the protrusion angle θ and the ratio F/W that is applicable to the disclosure is not limited to the examples in the above embodiments.

Accordingly, the backlight assembly according to the second embodiment provides a good effect of enhancing the brightness of a front view angle and other horizontal view angles by using the brightness redistribution film 14 having a structured surface 14B (having a flat region $A_F$), wherein the maximum brightness may occur on two sides (e.g., between 10 degrees and 60 degrees, and between −60 degrees and −10 degrees) of the front view angle. In addition, the flat region $A_F$ provided is capable of enhancing the front view angle brightness, such that the brightness ratio N of the front view angle brightness to the maximum brightness ranges between 60% and 100% (60%≤N<100%). In a backlight assembly according to another embodiment, the brightness ratio N is even between 80% and 100% (80%≤N<100%).

Third Embodiment

FIG. 5A shows a schematic diagram of a backlight assembly according to a third embodiment of the disclosure, and FIG. 5B is a section schematic diagram of some elements in FIG. 5A. In the third embodiment, a backlight assembly 10-3 includes an optical plate 11, a light source 12 provided near the optical plate 11, and a brightness redistribution film 14 provided above the optical plate 11. The brightness redistribution film 14 has a structured surface 14C provided towards the optical plate 11, and the structured surface 14C includes a plurality of protrusions 14P and a plurality of grooves 14G. The other side of the brightness redistribution film 14 is a light exiting surface 14ES opposite to the structured surface 14C. The structure of the backlight assembly shown in FIGS. 5A and FIG. 5B differs from that shown in FIGS. 1A and 1B in that, the protrusions 14P in the third embodiment has a trapezoidal cross section shape. The elements in FIGS. 5A and 5B the same as those in FIGS. 1A and 1B use the same denotations. Thus, details of the associated layers and components in FIGS. 5A and 5B, including the elements/layers and the space arrangements thereof, can be referred from the description associated with FIGS. 1A and 1B and are omitted herein.

As shown in FIG. 5B, the cross section of the protrusions 14P appears as a trapezoid, and thus the protrusions 14P can be regarded as having a maximum width P (the bottom of the trapezoid) and a minimum width L (the top of the trapezoid) in a first direction D1 (e.g., the X direction). In this embodiment, an angle θ of one protrusion 14P is an included angle of extension directions of two sides of the protrusion 14P. FIG. 5C shows a section schematic diagram of one single protrusion in FIG. 5B, and depicts that an included angle formed by extension directions of two sides of one single protrusion 14P having a trapezoidal cross section is the angle θ the protrusion 14P. In one embodiment, a ratio of the minimum width L of the protrusion 14P relative to the maximum width P (L/P) is between 0 and 0.8. An implementation form when L/P=0 is the protrusion having a triangular cross section of the first embodiment, and an implementation form when 0<L/P≤0.8 is the protrusion having a trapezoidal cross section of in the third embodiment as shown in FIGS. 5A and 5B.

In one embodiment, with matching design conditions, effects that horizontal view angles having a maximum brightness move from the front view angle towards two sides along the horizontal direction, while the front view angle has a sufficient brightness, can be achieved. For example, in one embodiment, when the angle θ the protrusions 14P having a trapezoidal cross section of the third embodiment ranges between 50 degrees and 90 degrees (50 degrees≤θ90 degrees) and L/P ranges between 0 and 0.8 (0<L/P≤0.8), the backlight assembly provides a maximum brightness on horizontal view angles of 10 degrees to 60 degrees and −60 degrees to −10 degrees.

An example of brightness redistribution is explained by using to a part of simulation experimentation and experimental results performed according to implementation of the third embodiment below.

Figure 6A:
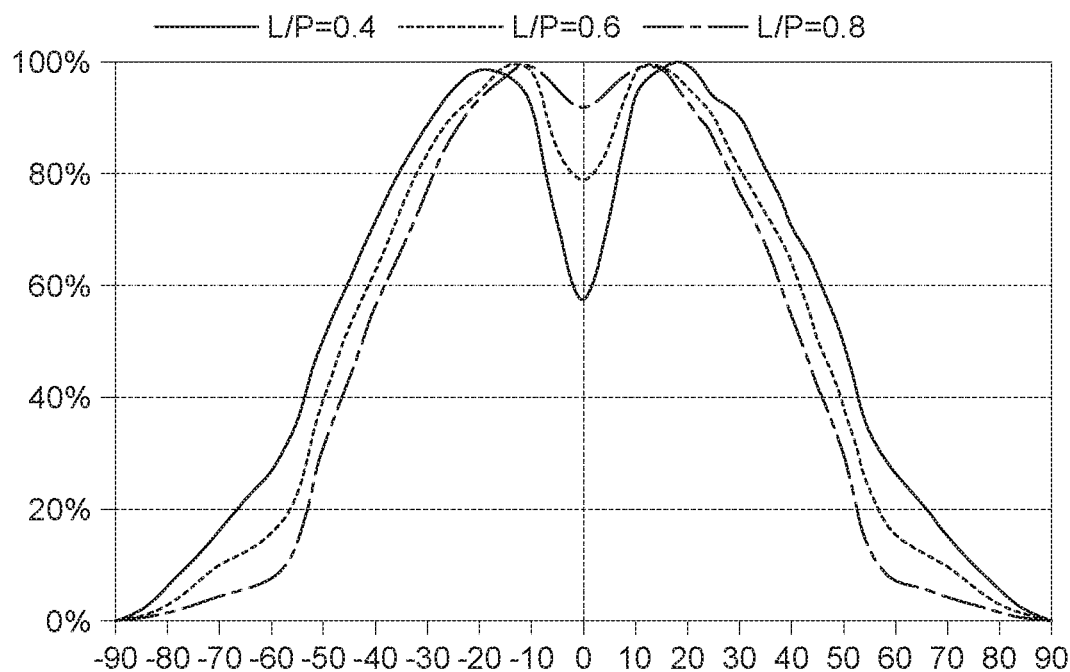
FIG. 6A shows brightness distribution curves on horizontal view angles under conditions of different ratios of minimum width to maximum width (L/P) and a 90-degree protrusion angle of the backlight assembly according to the third embodiment of the disclosure.

FIG. 6A shows brightness distribution curves on horizontal view angles under conditions of different ratios of minimum width to maximum width (L/P) and a 90-degree protrusion angle of the backlight assembly according to the third embodiment. The curves are brightness distribution curves of horizontal view angles of −90 degrees to 90 degrees obtained when the ratios L/P of the minimum width L relative to the maximum width P are equal to 0.4, 0.6 and 0.8. When the ratio L/P of the minimum width L to the maximum width P is equal to 0.4, the brightness ratio N of the front view angle brightness to the maximum brightness is still slightly smaller than 60%; as the ratio L/P gradually increases, the brightness ratio N also gradually increases. For example, when L/P=0.6, the brightness ratio N is approximately equal to 80%. Under conditions (where the protrusion angle θ is 90 degrees, and 0.4≤L/P≤0.8), the backlight assembly provides a maximum brightness on horizontal view angles of approximately 10 degrees to 25 degrees and −25 degrees to −10 degrees.

Figure 6B:
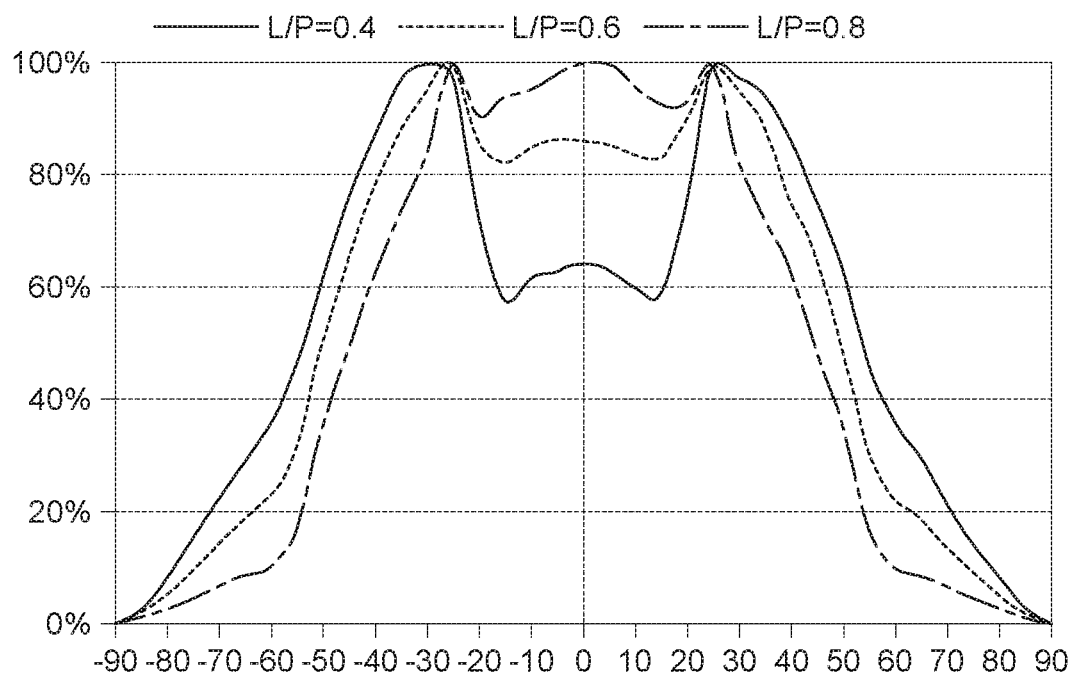
FIG. 6B shows brightness distribution curves on horizontal view angles under conditions of different ratios L/P and a 70-degree protrusion angle of the backlight assembly according to the third embodiment of the disclosure.

FIG. 6B shows brightness distribution curves on horizontal view angles under conditions of different ratios of minimum width to maximum width (L/P) and a 70-degree protrusion angle of the backlight assembly according to the third embodiment. The curves are brightness distribution curves of horizontal view angles of −90 degrees to 90 degrees obtained when the ratios L/P of the minimum width L relative to the maximum width P are equal to 0.4, 0.6 and 0.8. When the ratio L/P of the minimum width L to the maximum width P is equal to 0.4, the brightness ratio N of the front view angle brightness to the maximum brightness is slightly greater than 60%; as the ratio L/P gradually increases, the brightness ratio N also gradually increases. For example, when L/P=0.8, the brightness ratio N is approximately equal to 100%. Under conditions (where the protrusion angle θ is 90 degrees, and 0.4≤L/P≤0.8), the backlight assembly provides a maximum brightness on horizontal view angles of approximately 10 degrees to 40 degrees and −40 degrees to −10 degrees.

Figure 6C:
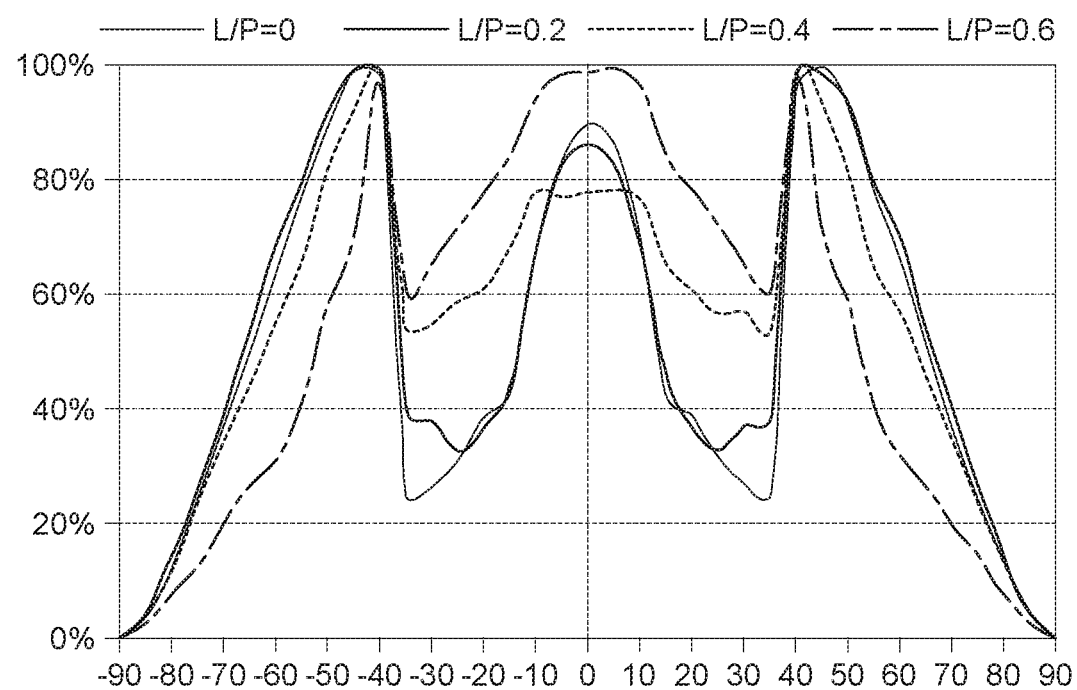
FIG. 6C shows brightness distribution curves on horizontal view angles under conditions of different ratios L/P and a 50-degree protrusion angle of the backlight assembly according to the third embodiment of the disclosure.

FIG. 6C shows brightness distribution curves on horizontal view angles under conditions of different ratios of minimum width to maximum width (L/P) and a 50-degree protrusion angle of the backlight assembly according to the third embodiment. The curves are brightness distribution curves of horizontal view angles of −90 degrees to 90 degrees obtained when the ratios L/P of the minimum width L relative to the maximum width P are equal to 0, 0.2, 0.4 and 0.6. Even when the ratio L/P of the minimum width L to the maximum width P is equal to 0 (equivalent to the embodiment shown in FIG. 1A) the brightness ratio N of the front view angle brightness to the maximum brightness is still greater than 60%; as the ratio L/P gradually increases, the brightness ratio N also gradually increases. For example, when L/P=0.6, the brightness ratio N is quite close to 100%. Under conditions (where the protrusion angle θ is 50 degrees, and 0≤L/P<0.6), the backlight assembly provides a maximum brightness on horizontal view angles of approximately 10 degrees to 50 degrees and −50 degrees to −10 degrees.

According to experimental results, the design of the protrusions 14P having a trapezoidal cross section in the brightness redistribution film 14 provides a good effect of enhancing the brightness of horizontal view angles apart from the front view angle, and can further enhance the front view angle brightness by changing the maximum width P (e.g., the width at the bottom of the trapezoid) and the minimum width L (e.g., the width at the top width of the trapezoid). For example, given an appropriate angle θ of the protrusions 14P, when the ratio L/P is between 0 and 0.8 (0<L/P≤0.8), the brightness ratio N of the front view angle brightness to the maximum brightness can range between 60% and 100% (60%≤N<100%). In a backlight assembly according to another embodiment, the brightness ratio N is further between 80% and 100%. It should be noted that, a combination of the protrusion angle θ and the ratio L/P is not limited to the examples in the above embodiments.

Fourth Embodiment

Figure 7A:
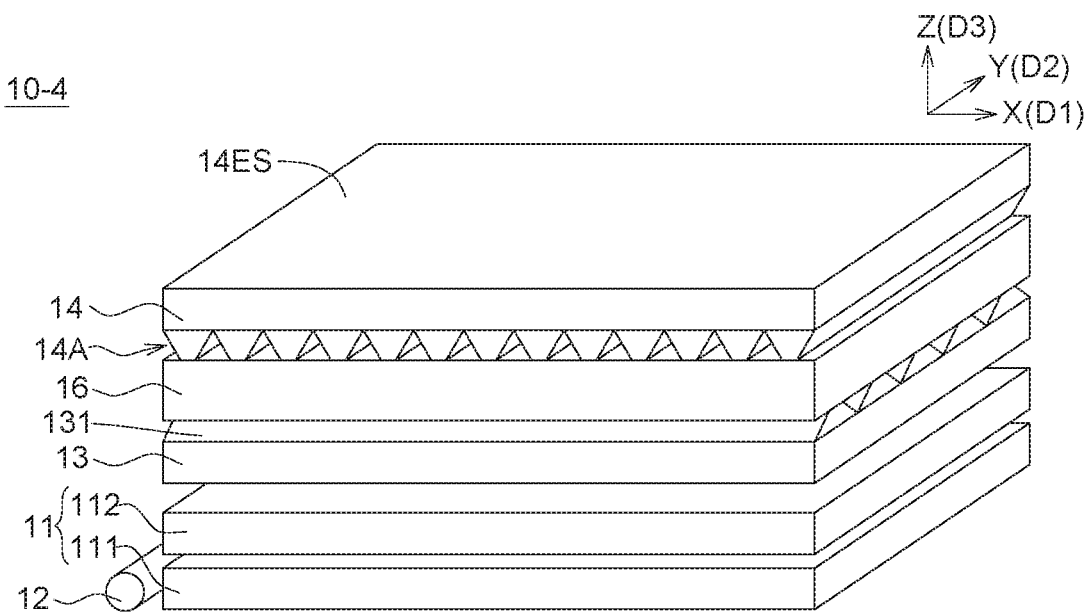
FIG. 7A is a schematic diagram of a backlight assembly according to a fourth embodiment of the disclosure.
Figure 7B:
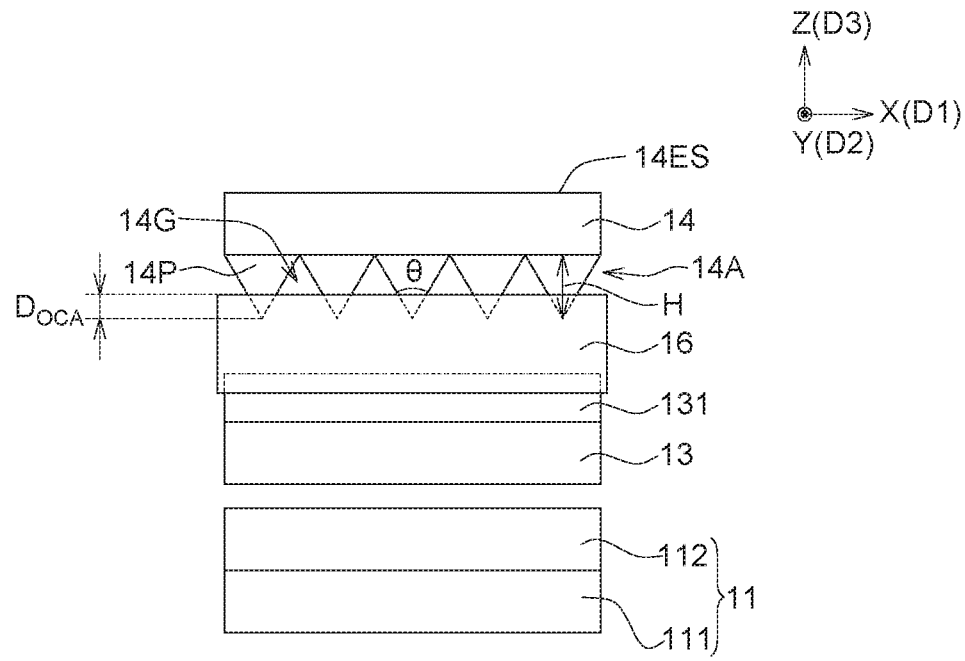
FIG. 7B is a section schematic diagram of some elements in FIG. 7A.

FIG. 7A shows a schematic diagram of a backlight assembly according to a fourth embodiment of the disclosure, and FIG. 7B shows a section schematic diagram of some elements in FIG. 7A. The elements in FIGS. 7A and 7B same as those in FIGS. 1A and 1B use the same denotations. Thus, details of the associated layers and components in FIGS. 7A and 7B, including the elements/layers and the space arrangements thereof, can be referred from the description associated with FIGS. 1A and 1B and are omitted herein.

A backlight assembly 10-4 of the fourth embodiment adopts a brightness redistribution film 14 as provided by the first embodiment, wherein the brightness redistribution film 14 includes protrusions 14P and grooves 14G alternately configured, and the protrusions 14P have a triangular cross section. The structure of the backlight assembly of the embodiment in FIGS. 7A and 7B differs from that in the FIGS. 1A and 1B in that, the backlight assembly 10-4 further includes an optical adhesive layer 16 located between the optical plate 11 and the brightness redistribution film 14. The material of the optical adhesive layer 16 may be, for example but not limited to, an optical clear adhesive (OCA).

To assemble the backlight assembly, the protrusions 14P of the brightness redistribution film 14 are provided towards the optical adhesive layer 16, and the optical film 13 and the brightness redistribution film 14 are adhered by the optical adhesive layer 16 in between. Due to the adhesive characteristics of the optical adhesive layer 16, the protrusions 14P after the assembly are partially embedded into the optical adhesive layer 16. As shown in FIG. 7B, assuming that the protrusions 14P have a height H in a third direction D3 (e.g., the Z direction), the embedded depth of the protrusions 14P is $D_{OCA}$.

In the fourth embodiment, the protrusions 14P after the assembly are partially embedded into the optical adhesive layer 16, such that a cross section shape of the protrusions 14P not embedded into the adhesive is changed to a trapezoid from the original triangle, achieving an effect similar to that of the third embodiment, By adjusting the depth by which the protrusions 16P are sunken into the optical adhesive layer 16, the brightness ratio N of the front view angle brightness to the maximum brightness can range between 60% and 100% (60%≤N<100%).

Figure 8:
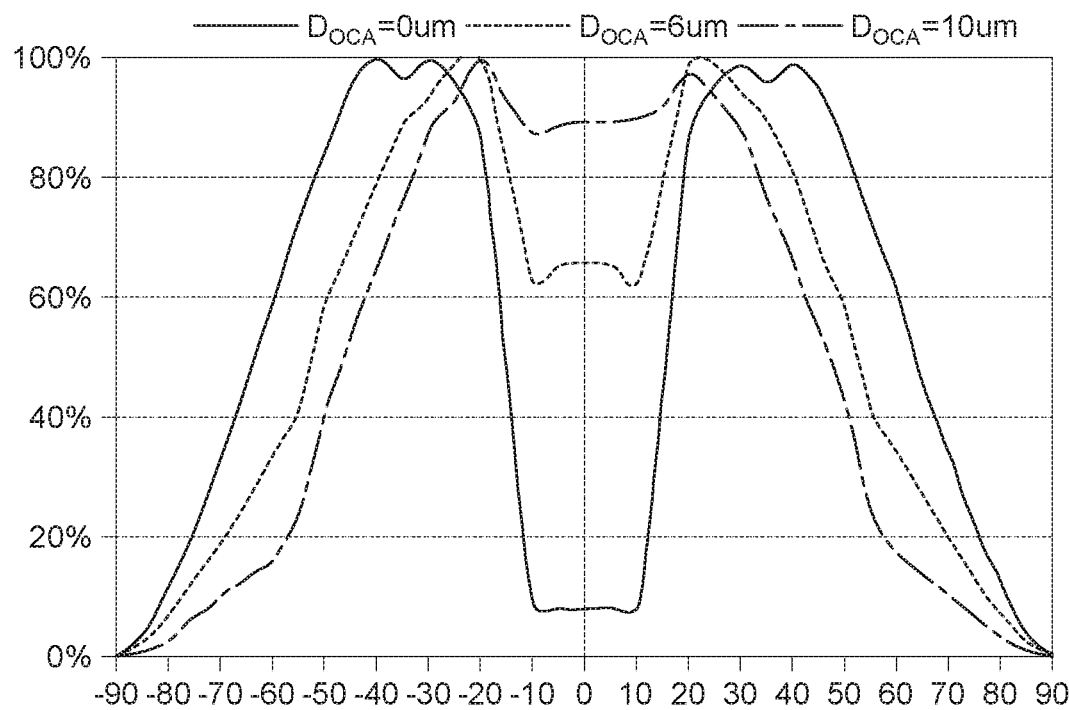
FIG. 8 shows brightness distribution curves on horizontal view angles of the backlight assembly when protrusions are sunken by different depths into an optical adhesive layer in the backlight assembly according to the fourth embodiment of the disclosure.

FIG. 8 shows brightness distribution curves on horizontal view angles of a backlight assembly when protrusions are embedded into an optical adhesive layer by different depths of the backlight assembly according to a fourth embodiment of the disclosure. In one embodiment, when the embedded depth $D_{OCA}$ of the protrusions 14P is 6 μm to 10 μm, the maximum brightness occurs on horizontal view angles ranging between 20 degrees and 50 degrees and between −50 degrees and −20 degrees.

In the backlight assembly according to the fourth embodiment, similar to the third embodiment, the protrusions 14P partially embedded into the optical adhesive layer 16 provide good effects of enhancing the brightness of horizontal view angles apart from the front view angle, as well as enhancing the front view angle brightness, such that the brightness ratio N of the front view angle brightness to the maximum brightness ranges between 60% and 100% (60%≤N<100%). In a backlight assembly according to another embodiment, the brightness ratio N further ranges between 80% and 100% (80%≤N<100%).

Fifth Embodiment

Figure 9:
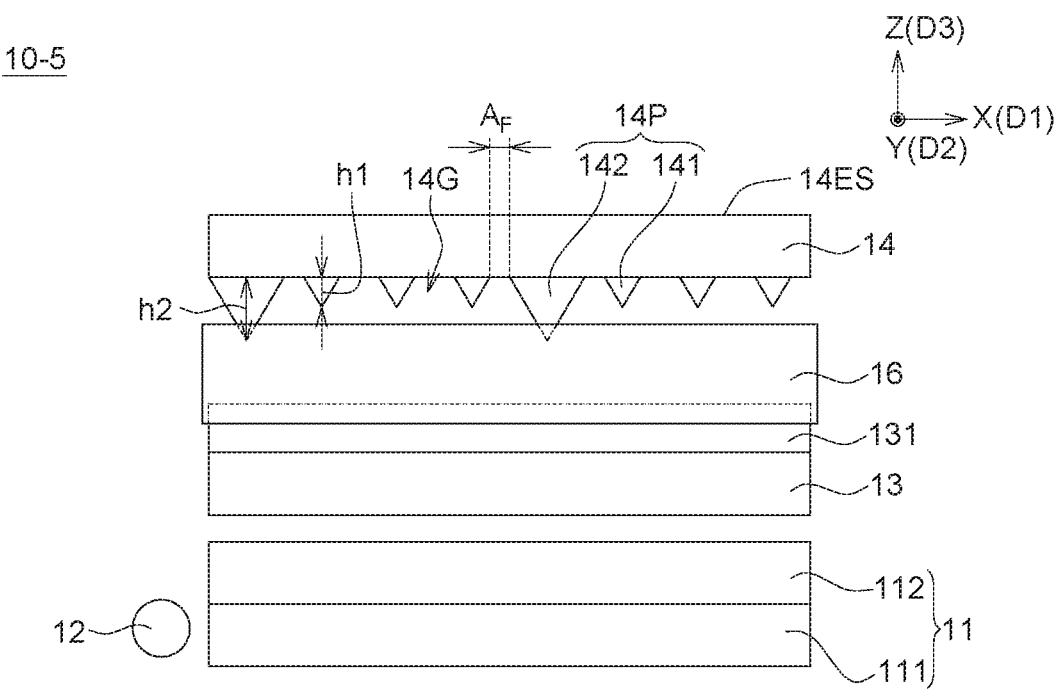
FIG. 9 is a section schematic diagram of a backlight assembly according to a fifth embodiment of the disclosure.

FIG. 9 shows a section schematic diagram of a backlight assembly according to a fifth embodiment of the disclosure. Elements in FIG. 9 same as those in FIGS. 7A, 7B, 3A and 3B use the same denotations. Thus, details of the associated layers and components in FIG. 9 including the elements/layers and the space arrangements thereof, can be referred from the description associated with the second and fourth embodiments and are omitted herein.

In the fifth embodiment, a brightness redistribution film 14 as that provided by the second embodiment is adopted, wherein the brightness redistribution film 14 includes protrusions 14P and grooves 14G alternately configured. The protrusions 14P have a triangular cross section, and the grooves 14G have flat regions $A_F$, Moreover, the structure of the backlight assembly of the fifth embodiment differs from that of the fourth embodiment in that, the protrusions 14P of the fifth embodiment at least include protrusions of two different heights.

As shown in FIG. 9, the protrusions 14P include m first protrusions 141 and n second protrusions 142, wherein the first protrusions 141 have a first height (e.g., a height measured on the Z direction), the second protrusions 142 have a second height h2 (e.g., a height measured on the Z direction), the first height h1 is smaller than the second height h2, and m and n are positive integers and m>n. That is, the quantity of the higher second protrusions 142 is less than the quantity of the first protrusions 141. In one embodiment, 0<n/m≤1/3 (that is, one second protrusion 142 having a greater height is provided for at least every three first protrusions 141). As an example shown in FIG. 9, one second protrusion 142 is provided for every three first protrusions 141 provided. It should be noted that, the disclosure is not limited to the exemplary configuration ratio above, and an appropriate configuration ratio can be used according to actual application requirements.

When 0<n/m≤1/3, an effect on horizontal view angles can be the same as that without an optical adhesive layer 16; that is, having a similar brightness distribution.

To assemble the backlight assembly, the protrusions 14P of the brightness redistribution film 14 are provided towards the optical adhesive layer 16, and an optical film 13 and the brightness redistribution film 14 are adhered by the optical adhesive layer 16 in between. Due to adhesive characteristics of the optical adhesive layer 16, the second protrusions 142 after the assembly are partially embedded into the optical adhesive layer 16 and present a trapezoidal cross section, whereas the shape of the cross section of the first protrusions 141 not embedded into the optical adhesive layer 16 still appears as a triangle. In addition to enhancing the front view angle brightness, the second protrusions 142 further provide a support effect, such that the first protrusions 141 do not sink into the optical adhesive layer 16 and be maintained with an existing cross section shape (e.g., a triangle). Thus, the second protrusions 142 can reduce an expected optical effect of the first protrusions 141 used due to the optical adhesive layer 16. In one embodiment, the first protrusions 141 and the optical adhesive layer 16 are spaced by a distance, as shown in FIG. 9; however, the disclosure is not limited thereto. In another embodiment, the second protrusions 142 after the assembly can be in contact with the optical adhesive layer 16 (without any distance in between) but not sunken into the optical adhesive layer and thus be maintained with a triangular cross section thereof.

Figure 10:
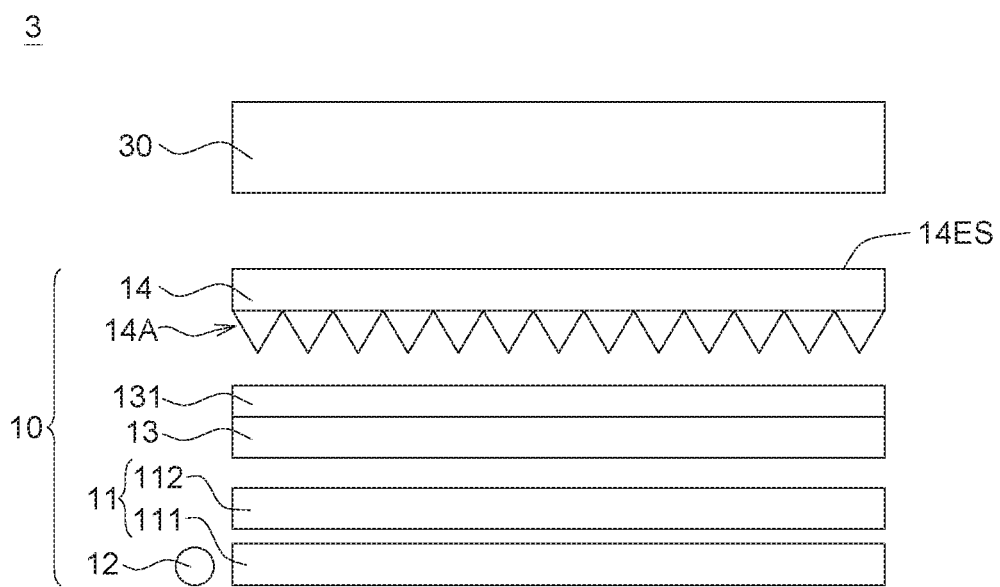
FIG. 10 is a section schematic diagram of a display device according to an embodiment of the disclosure.

FIG. 10 shows a section schematic diagram of a display device according to an embodiment of the disclosure. A display device 3 includes a display panel 30 and a backlight assembly 10 provided on one side of the display panel 30. As shown in FIG. 10, the backlight assembly 10 is provided below the display panel 30 to provide the display panel 30 with light. Although the backlight assembly 10 of the first embodiment is used to explain a display device of the disclosure, the backlight assemblies in, e.g., the second to fifth embodiments or backlight assemblies of other embodiments that are not depicted, can also be applied to the display device. Details of the backlight of the embodiments can be referred from the above description, and are omitted herein. The display panel 30 includes two upper and lower substrates and components of a display medium layer provided therebetween, wherein the display medium layer includes, e.g., liquid crystals, organic light emitting diodes, quantum dots, fluorescent light, phosphorus light, light emitting diodes, micro light emitting diodes or other display medium. The associated components of the display panel 30 are determined according to an implementation form of a display panel of application requirements and are generally known to a person skilled in the art, and are thus omitted herein. Further, the display device of the disclosure can be a flexible display device, a touch display device, or a curved display device; the disclosure does not limit the type of display device.

In conclusion, the backlight assemblies provided by the embodiments achieve effects of enhancing the brightness of horizontal view angles apart from the front view angle (allowing the maximum brightness to occur on two sides of the front view angle) by using a brightness redistribution film having a structured surface, while maintaining a display brightness of a certain range for the front view angle. For example, the brightness ratio N of the front view angle brightness to the maximum brightness is rendered to range between 60% and 100% (60%≤N<100%). In backlight assemblies of other embodiments, the brightness ratio N can even range between 80% and 100% (80%≤N<100%). The backlight assemblies of the embodiments can be applied to a diversity of display devices, e.g., primarily display products needing to maintain a high brightness for horizontal view angles apart from the front view angle, for example but not limited to, in-vehicle displays. Compared to a conventional in-vehicle display, by applying the backlight assemblies of the embodiments to an in-vehicle display as a backlight module thereof, optimized horizontal view angles can be achieved, enhancing the brightness of a display at a direction of sight of a driver/front passenger, while maintaining a display brightness of a certain range for the front view angle for an individual in front of the display to view, and increasing effects and values of use of the display. In addition, the structures of the backlight assemblies provided by the embodiments are easy to manufacture and integrate, and are thus suitable for mass production.

Other embodiments, such as known components of elements having different configurations and arrangements, or associated components made of different materials, can also be applied. For example, the structure and form of the protrusions of the brightness redistribution film and the material of the brightness redistribution film can also be appropriately adjusted or modified according to actual application requirements and conditions. Therefore, the structures in the description and drawings merely serve for illustration purposes and are not to be construed as limitation to the disclosure. Further, a person skilled in the art should know that the shapes and positions of the constituting components of the embodiments are not limited to the implementation forms depicted in the drawings, and adjustment can be correspondingly made according to actual application and/or manufacturing step requirements without departing from the spirit of the disclosure.

While the disclosure has been described by way of example and in terms of the preferred embodiments, it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A backlight assembly, comprising:
an optical plate;
a light source, provided near the optical plate; and
a brightness redistribution film, provided above the optical plate and having a light exiting surface;
wherein, when light emitted by the light source passes through the optical plate and the brightness redistribution film, a front view angle brightness measured in a normal line direction of the light exiting surface of the brightness redistribution film has a brightness ratio relative to a maximum brightness emitted from the backlight assembly, and the brightness ratio is greater than or equal to 60% and smaller than 100%.

2. The backlight assembly according to claim 1, wherein the maximum brightness emitted from the backlight assembly appears on horizontal is view angles between 10 degrees and 60 degrees.

3. The backlight assembly according to claim 1, wherein the brightness redistribution film comprises a structured surface provided towards the optical plate, the structured surface comprises a plurality of protrusions and a plurality of grooves, and the plurality of protrusions and the plurality of grooves are alternately configured.

4. The backlight assembly according to claim 3, wherein a cross section shape of one of the protrusions is triangular or trapezoidal.

5. The backlight assembly according to claim 4, wherein one of the protrusions has a maximum width and a minimum width in a first direction, a ratio of the minimum width relative to the maximum width is a first ratio, and the first ratio is greater than or equal to 0 and smaller than or equal to 0.8.

6. The backlight assembly according to claim 3, wherein the plurality of protrusions comprise protrusions of at least two different heights.

7. The backlight assembly according to claim 3, wherein one of the plurality of grooves has a flat region, one of the plurality of protrusions has a maximum width in a first direction, the flat region has a flat width in the first direction, a ratio of the flat width relative to the maximum width is a second ratio, and the second ratio is greater than 0 and smaller than or equal to 5.

8. The backlight assembly according to claim 3, further comprising:
an optical adhesive layer, located between the optical plate and the brightness redistribution film;
wherein, the plurality of protrusions of the brightness redistribution film are provided towards the optical adhesive layer, and at least a part of the plurality of protrusions are embedded into the optical adhesive layer.

9. The backlight assembly according to claim 1, further comprising an optical film located between the optical plate and the brightness redistribution film.

10. The backlight assembly according to claim 6, wherein the plurality of protrusions comprise m first protrusions having a first height and n second protrusions having a second height that is greater than the first height, m and n are positive integers, and $0 < n/m \leq 1/3$.

11. A display device, comprising:
a display panel;
a backlight assembly, provided on one side of the display panel, comprising:
an optical plate;
a light source, provided near the optical plate; and
a brightness redistribution film provided above the optical plate and having a light exiting surface;
wherein, when light emitted by the light source passes through the optical plate and the brightness redistribution film, a front view angle brightness measured in a normal line direction of the light exiting surface of the brightness redistribution film has a brightness ratio relative to a maximum brightness emitted from the backlight assembly, and the brightness ratio is greater than or equal to 60% and smaller than 100%.

12. The display device according to claim 11, wherein the maximum brightness emitted from the backlight assembly appears on horizontal view angles between 10 degrees and 60 degrees.

13. The display device according to claim 11, wherein the brightness redistribution film comprises a structured surface provided towards the optical plate, the structured surface comprises a plurality of protrusions and a plurality of grooves, and the plurality of protrusions and the plurality of grooves are alternately configured.

14. The display device according to claim 13, wherein a cross section shape of one of the protrusions is triangular or trapezoidal.

15. The display device according to claim 14, wherein one of the protrusions has a maximum width and a minimum width in a first direction, a ratio of the minimum width relative to the maximum width is a first ratio, and the first ratio is greater than or equal to 0 and smaller than or equal to 0.8.

16. The display device according to claim 13, wherein the plurality of protrusions comprise protrusions of at least two different heights.

17. The display device according to claim 13, wherein one of the plurality of grooves has a flat region, one of the plurality of protrusions has a maximum width in a first direction, the flat region has a flat width in the first direction, a ratio of the flat width relative to the maximum width is a second ratio, and the second ratio is greater than 0 and smaller than or equal to 5.

18. The display device according to claim 13, wherein the backlight assembly further comprises:
an optical adhesive layer, located between the optical plate and the brightness redistribution film;
wherein, the plurality of protrusions of the brightness redistribution film are provided towards the optical adhesive layer, and at least a part of the plurality of protrusions are embedded into the optical adhesive layer.

19. The display device according to claim 11, wherein the backlight assembly further comprises an optical film located between the optical plate and the brightness redistribution film.

20. The display device according to claim 16, wherein the plurality of protrusions comprise m first protrusions having a first height and n second protrusions having a second height that is greater than the first height, m and n are positive integers, and $0 < n/m \leq 1/3$.

* * * * *